No. 821,690. PATENTED MAY 29, 1906.
C. A. WIDMER.
BUSHING.
APPLICATION FILED AUG. 21, 1905.

Witnesses:
J. E. Arthur
H. E. Chase

Inventor:
Charles A. Widmer
By
Howard P. Denison
Attorney.

UNITED STATES PATENT OFFICE.

CHARLES A. WIDMER, OF SYRACUSE, NEW YORK, ASSIGNOR TO PICROME HIDE COMPANY, OF SYRACUSE, NEW YORK, A CORPORATION OF NEW YORK.

BUSHING.

No. 821,690. Specification of Letters Patent. Patented May 29, 1906.

Application filed August 21, 1905. Serial No. 275,092.

*To all whom it may concern:*

Be it known that I, CHARLES A. WIDMER, of Syracuse, in the county of Onondaga, in the State of New York, have invented new and useful Improvements in Bushings, of which the following, taken in connection with the accompanying drawings, is a full, clear, and exact description.

This invention relates to improvements in bushings, and particularly split bushings for loose pulleys or for journal-bearings in which it is desired to provide a wearing surface or bearing made up of laminations arranged side by side throughout the length of the bearing so that the edges of the laminations are presented to the shaft.

My object is to incase these laminations in a comparatively inexpensive sheet-metal housing which may be stamped or pressed in the form of semicylindrical sections, each made of a single piece having its ends crimped inwardly and firmly against the end faces of the laminated inner cylinder.

Figure 1:
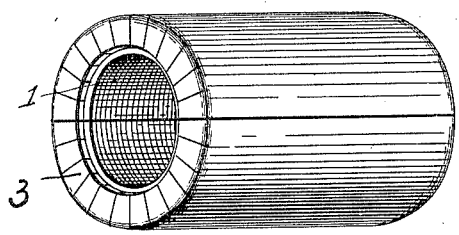
Figure 2:
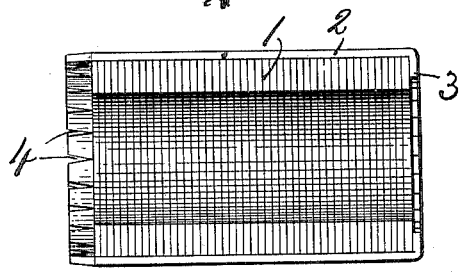

In the drawings, Figure 1 is a perspective view of a split bushing embodying the features of my invention. Fig. 2 is an inner face view of one of the half-sections of the bushing, showing one end of the outer shell as crimped or turned inwardly against the end face of the laminated cylinder, while the other end of said section is shown as extended prior to being crimped.

This bushing comprises two opposite semicylindrical sections, each composed of an inner semicylinder 1 of hide, vulcanized fiber, or any other similar cheap material which is capable of affording a certain degree of lubrication, either by absorbing and retaining the lubricant, as might be done with wood, fiber, or similar absorbent, or it might be made of hide, which contains its own lubricant. This inner semicylinder is made of a series of semicircular strips or disks pressed together face to face and incased in a semicylindrical metal sleeve-section 2, which fits snugly upon the periphery of the section 1 and has its opposite ends crimped or bent inwardly at 3 against the opposite ends of the section 1 to firmly bind or retain the laminations in operative position. In order that these inturned edges may lie in substantially the same plane when turned over or inwardly, I provide the ends with a series of V-shaped cut-outs 4, and the inturned edges are made of less radial projection than the thickness of the laminations 1, so that the inner edges of the inturned flanges 3 terminate short of the inner bearing-face of the cylinder 1. These laminations may be compressed in the same operation of turning or crimping the flanges 3 inwardly, or the several strips may be first compressed into the desired form and then retained by the outer metal casing 2 and flanges 3.

What I claim is—

1. A bushing comprising inner semicylindrical sections, and outer semicylindrical casing-sections having their end edges crimped or bent inwardly against the ends of the inner semicylindrical sections.

2. A split bushing comprising inner semicylinders each composed of semicircular laminations pressed together face to face, and semicylindrical casing-sections of sheet metal inclosing said inner sections and having their ends crimped or bent inwardly upon the end faces of the inner sections.

In witness whereof I have hereunto set my hand this 12th day of August, 1905.

CHARLES A. WIDMER.

Witnesses:
H. E. CHASE,
HOWARD P. DENISON.